United States Patent [19]

Vallet

[11] 3,878,396

[45] Apr. 15, 1975

[54] COMPOSITION EMITTING INFRA-RED RADIATION

[75] Inventor: Andre Vallet, Bordeaux, France

[73] Assignee: Societe Europeenne de Propulsion Societe Anonyme dite, Puteaux, France

[22] Filed: Sept. 26, 1973

[21] Appl. No.: 400,981

[30] Foreign Application Priority Data

Oct. 27, 1972 France .............................. 72.38245

[52] U.S. Cl. ................................ 250/493; 219/553
[51] Int. Cl. ............................................ H01j 35/00
[58] Field of Search .................... 250/493, 495, 504; 219/553, 354

[56] References Cited
UNITED STATES PATENTS

| | | | |
|---|---|---|---|
| 2,933,317 | 4/1960 | Pittinger et al. | 250/493 |
| 3,219,827 | 11/1965 | Pittinger | 250/504 |
| 3,275,829 | 9/1966 | McClune et al. | 250/493 |
| 3,539,811 | 11/1970 | Risgin | 250/493 |
| 3,578,974 | 5/1971 | Thomas | 250/493 |
| 3,596,098 | 7/1971 | Stetter | 250/493 |

Primary Examiner—James W. Lawrence
Assistant Examiner—B. C. Anderson
Attorney, Agent, or Firm—Eyre, Mann & Lucas

[57] ABSTRACT

A composition for emitting infra-red radiation is provided, comprising:

i. at least two chemical compounds which, in the presence of water, react with one another exothermically, and ii. at least one chemical compound which releases ammonia on reaction with water, the exothermicity of either or both reactions being sufficient to raise the temperature of the ammonia produced such that it emits infra-red radiation.

10 Claims, No Drawings

COMPOSITION EMITTING INFRA-RED RADIATION

The present invention relates to a composition which emits infra-red raadiation which can be used as a lure for infra-red detectors.

It is known that certain missiles, for example air to sea missiles, are guided towards their objective with the aid of an infra-red detector which receives the rays emitted by the objective. It is thus possible to divert such missiles from their targets by using lures or decoys which are placed a certain distance from the target and which emit infra-red radiation analogous to that emitted by the target.

A variety of different types of infra-red emittors are known. These include hot gases, flames and combustion products. However, these various types of material present certain disadvantages, for example they emit, simultaneously, visible light as well as infra-red light and/or they form smoke clouds which are readily detectable and/or they emit infra-red radiation which does not correspond exactly with that emitted by the target. Further, these various sources of infra-red radiation are often difficult to position with sufficient speed and without detection.

The present invention provides a composition which can be used as a lure, in the presence of water, which reduces or eliminates the disadvantages mentioned above. According to the present invention there is provided an anhydrous composition which comprises:

at least two chemical compounds which, in the presence of water, react together strongly exothermically, and at least one chemical compound which produces ammonia in the presence of water. Generally, the compositions of the present invention are in the form of solid powders.

It is known that ammonia emits a characteristic infra-red radiation at high temperatures, generally of the order of 800°C. or more. Consequently, the chemical compounds which react exothermically should be adapted to provide a sufficient rise in temperature for the ammonia which is released by the second ingredient on contact with water. A suitable exothermic combination comprises an anhydride of a mineral acid and at least one reactive metal oxide such as an alkaline earth metal oxide. One skilled in the art will however, appreciate that other combinations are possible.

Examples of suitable anhydrides of mineral acids include the anhydrides of phosphoric, arsenic, bismuthic, and antimonic acids; phosphoric anhydride is preferred because it is very reactive and is simple to use. Of course, it is possible to use a mixture of anhydrides.

As indicated, the preferred metal oxides are alkaline earth metal oxides. Barium oxide is preferred. The relative proportions of the anhydride and oxide can vary but it is generally preferable, so as to obtain the maximum effect, to use amounts which are approximately the stoichiometric amounts which give rise to the formation of a salt or salts. The reaction between these two types of chemical compounds enables one to obtain elevated temperatures with the emission of intense infra-red radiation in the wavelength range from about 0.5 to 6 microns.

To such chemical compounds, a compound is added which, on reaction with water, produces ammonia. The reaction which produces ammonia can be carried out, depending on the selected compound, either at ambient temperature or at elevated temperature since the composition of the present invention will be raised to an elevated temperature by the reaction between the anhydride and the metal oxide, as described above.

Preferably, the ammonia-producing compound is a nitride, urea or a derivative of urea. Suitable nitrides include, for example, magnesium and aluminium nitrides.

By virtue of the presence of this nitrogen-containing compound which gives rise to the formation of ammonia on contact with water, the mixture of the present invention emits, in use, intense infra-red radiation in the wavelength range from about 8 to 30 microns.

The total strength of the rays emitted is, evidently, dependent on the quantities of the substances used. By varying the quantity of the ammonia-producing substance relative to the other compounds one can readily adapt the effective infra-red emission in the specified range (namely 0.5 to 6 microns and 8 to 13 microns).

The composition of the present invention can readily be prepared, for example on simple mixing as a powdered product. The mixing must, of course, be carried out in the absence of moisture and it is generally better to obtain a homogeneous mixture of the anhydride and oxide and then to add the nitride, for example.

The composition of the present invention can be used in a variety of ways. For example, it is possible to place the composition in a cylinder, suitably of insulating material, provided with apertures so that water can enter the cylinder, the cylinder being kept at a suitable distance from the target by any known means. As soon as the cylinder comes into contact with the water the reactions commence. The temperature and the composition of the water are not of significant importance; experiments have shown that excellent results can be obtained using very cold sea water.

The following Example further illustrates the present invention.

EXAMPLE

The following ternary mixture was prepared:
3.12 g of $P_2O_5$
10 g of BaO
6 g. of magnesium nitride.

This mixture was introduced into a cylinder of insulating material provided with apertures. The cylinder, provided with suitable flotation devices was carried on the surface of the sea, the temperature of which is 8°C.

After about 10 seconds, one obtained an intense emission of infra-red radiation in the wavelength range between 0.73 microns and 10.5 microns.

It should be pointed out that the compositions of the present invention need only water for the infra-red rays to be emitted and no form of lighting is required.

I claim:

1. A composition for emitting infra-red radiation in the presence of water comprising:
   a. a first reactive entity comprising at least two chemical compounds which react with each other exothermically in the presence of water;
   b. a second reactive entity comprising at least one chemical compound which reacts with water to release ammonia;
   c. the heat generated by the first and second reactive entities when combined with water being sufficient to raise the temperature of the said released ammonia to a temperature at which it emits infra-red radiation.

2. A composition according to claim 1 in which component i) comprises an anhydride of a mineral acid and a metal oxide.

3. A composition according to claim 2 in which the mineral acid anhydride is phosphoric acid anhydride.

4. A composition according to claim 2 in which the metal oxide is an alkaline earth metal oxide.

5. A composition according to claim 4 in which the metal oxide is barium oxide.

6. A composition according to claim 2 in which the compounds of component i) are used in amounts approximately corresponding to the stoichiometic amounts required for the production of the corresponding salt or salts.

7. A composition according to claim 1 in which component ii) comprises at least one nitride, urea or urea derivative.

8. A composition according to claim 7 in which component ii) comprises aluminium or magnesium nitride.

9. A composition according to claim 1 which is housed in a perforated container of insulating material.

10. A method of deflecting a missile which homes on the target by means of an infra-red detector which comprises:
 a. placing at an appropriate distance from the intended target of the missile a composition comprising:
  i. a first reactive entity comprising at least two chemical compounds which react with each other exothermically in the presence of water;
  ii. a second reactive entity comprising at least one chemical compound which reacts with water to release ammonia;
  iii. the heat generated by the first and second reactive entities when combined with water being sufficient to raise the temperature of the said released ammonia to a temperature at which it emits infra-red radiation; and
 b. putting said composition into contact with water.

* * * * *